(12) United States Patent
Tekin

(10) Patent No.: US 12,305,067 B2
(45) Date of Patent: May 20, 2025

(54) ADDITIVE MATERIAL COMPOSITION AND PRODUCTS MADE THEREFROM

(71) Applicant: BORTIGIN LLC, Indian Orchard, MA (US)

(72) Inventor: Mustafa Tansel Tekin, South Hadley, MA (US)

(73) Assignee: BORTIGIN LLC, South Hadley, MA (US)

( * ) Notice: Subject to any disclaimer, the term of this patent is extended or adjusted under 35 U.S.C. 154(b) by 537 days.

(21) Appl. No.: 17/567,139

(22) Filed: Jan. 2, 2022

(65) Prior Publication Data

US 2022/0119672 A1  Apr. 21, 2022

Related U.S. Application Data

(63) Continuation-in-part of application No. 17/624,310, filed as application No. PCT/TR2020/050532 on Jun. 22, 2020.

(51) Int. Cl.
| | |
|---|---|
| *C09D 163/00* | (2006.01) |
| *B29C 70/30* | (2006.01) |
| *C08K 3/22* | (2006.01) |
| *C08K 3/26* | (2006.01) |
| *C08K 3/38* | (2006.01) |
| *C09D 7/61* | (2018.01) |
| *C09D 7/80* | (2018.01) |

(52) U.S. Cl.
CPC ............ *C09D 163/00* (2013.01); *B29C 70/30* (2013.01); *C08K 3/22* (2013.01); *C08K 3/26* (2013.01); *C08K 3/38* (2013.01); *C09D 7/61* (2018.01); *C09D 7/80* (2018.01); *B29K 2995/0016* (2013.01); *C08K 2003/222* (2013.01); *C08K 2003/262* (2013.01)

(58) Field of Classification Search
CPC .............. C09D 7/61; C08K 3/26; C08K 3/38
See application file for complete search history.

(56) References Cited

U.S. PATENT DOCUMENTS

| | | | | |
|---|---|---|---|---|
| 8,123,988 | B2* | 2/2012 | Thompson, Jr. | C09K 21/14 252/607 |
| 2004/0254328 | A1* | 12/2004 | Haraguchi | B29C 43/003 528/91 |

FOREIGN PATENT DOCUMENTS

| | | | | |
|---|---|---|---|---|
| CN | 107053406 A | * | 8/2017 | ............ B27D 1/08 |
| GB | 2255345 A | * | 11/1992 | ........... C09D 133/06 |
| WO | WO-2005073343 A1 | * | 8/2005 | ............ C09K 21/04 |

* cited by examiner

*Primary Examiner* — Vickey Nerangis
(74) *Attorney, Agent, or Firm* — Bulkey, Richardson and Gelinas, LLP; Mary R. Bonzagni, Esq.

(57) ABSTRACT

An additive material has a composition of from about 50 wt % to about 95 wt % of a base material and a curing agent when required to cure the base material, and from about 5 wt % to about 50 wt % of a weight percentage of boric acid and a weight percentage of sodium bicarbonate, wherein the weight percentage of boric acid is greater than the weight percentage of sodium bicarbonate. The composition optionally further includes a weight percentage of magnesium oxide.

14 Claims, 2 Drawing Sheets

ADDITIVE MATERIAL COMPOSITION AND PRODUCTS MADE THEREFROM

CROSS-REFERENCE TO RELATED APPLICATIONS

The present application is a continuation-in-part of U.S. patent application Ser. No. 17/624,310, filed Dec. 31, 2021, which is a national stage filing of PCT International Application No. PCT/TR2020/050532, filed Jun. 22, 2020, which claims priority to Turkish Patent Application No. 2020/09188, filed Jun. 15, 2020, the contents of all of which are incorporated by reference herein.

FIELD OF THE INVENTION

The subject matter disclosed herein relates in general to an additive material, and more specifically to an improved additive material which provides many beneficial characteristics (e.g., greater strength, fire resistant, flame retardant, anti-bacterial, lighter weight, etc.) to other materials that it is mixed with to form products which can be utilized in many varied industries.

BACKGROUND OF THE INVENTION

Known, prior art additive materials are made from different substances and are used for various industrial purposes, such as insulation materials due to their fire resistant and flame-retardant qualities. In general, these insulation materials can be classified into three categories. A first category includes iron-steel and metal alloy insulation materials. Disadvantages of these insulation materials are that they are relatively heavy, unprotected against corrosion (i.e., low resistance to corrosion), difficult to maintain, and have a relatively high cost of recycling. A second category includes wood insulation materials, whose primary disadvantages are that they are also unprotected against corrosion, they are open to bacterial growth since they house bacteria, and they have a relatively low heat resistance. A third category includes insulation materials produced from plastic and plastic derivatives. Insulation materials made from plastic and its derivatives have relatively low heat resistance and impact resistance. In addition, these materials are open to bacterial growth since they house bacteria.

What is needed is an additive material that can have many different beneficial features and uses, including as an insulation material and, as such, the additive material overcomes the various disadvantages of known, prior art insulation materials.

BRIEF SUMMARY OF THE INVENTION

An object of embodiments of the present invention is to provide a high strength, highly elastic, lightweight, and mass-producible additive material with relatively high resistance to heat, corrosion, and impact.

Another object of embodiments of the present invention is to provide an additive material with relatively high strength and high elasticity, which allows for its use in many varied industries that require high strength materials which can withstand high amounts of external forces, such as construction, machinery and equipment, defense equipment, and land-sea-air vehicles (e.g., race cars, boats).

Yet another object of embodiments of the present invention is to provide an additive material that allows for its use in various commercial product industries such as art, furniture, apparel, and accessories.

Still another object of embodiments of the present invention is to provide an additive material that can be produced relatively easily and without the need for relatively high temperatures during the production process.

Another object of embodiments of the present invention is to provide an additive material that has sufficient high heat resistance such that it can be used by itself as a flame-retardant material.

Still another object of embodiments of the present invention is to provide an additive material that can be used as an insulation material and is relatively lightweight as compared to known, prior art metal, wood, and plastic-based insulation materials.

Another object of embodiments of the present invention is to provide an additive material that has improved durability as compared to known, prior art impact-resistant materials of the same size.

Still another object of embodiments of the present invention is to provide an additive material that can be used as protective coating or as an adhesive.

According to an embodiment of the present invention, a composition of an additive material includes from about 50 wt % to about 95 wt % of a base material and a curing agent when required to cure the base material, and from about 5 wt % to about 50 wt % of a weight percentage of boric acid and a weight percentage of sodium bicarbonate, wherein the weight percentage of boric acid is greater than the weight percentage of sodium bicarbonate. The composition optionally further includes a weight percentage of magnesium oxide.

BRIEF DESCRIPTION OF THE DRAWINGS

The subject matter, which is regarded as the disclosure herein of exemplary embodiments of the present invention, is particularly pointed out and distinctly claimed in the claims at the conclusion of this specification. The forgoing and other features and advantages of the present invention will become more apparent when the following detailed description is taken in conjunction with the accompanying drawings in which:

DETAILED DESCRIPTION OF THE INVENTION

Figure 1:
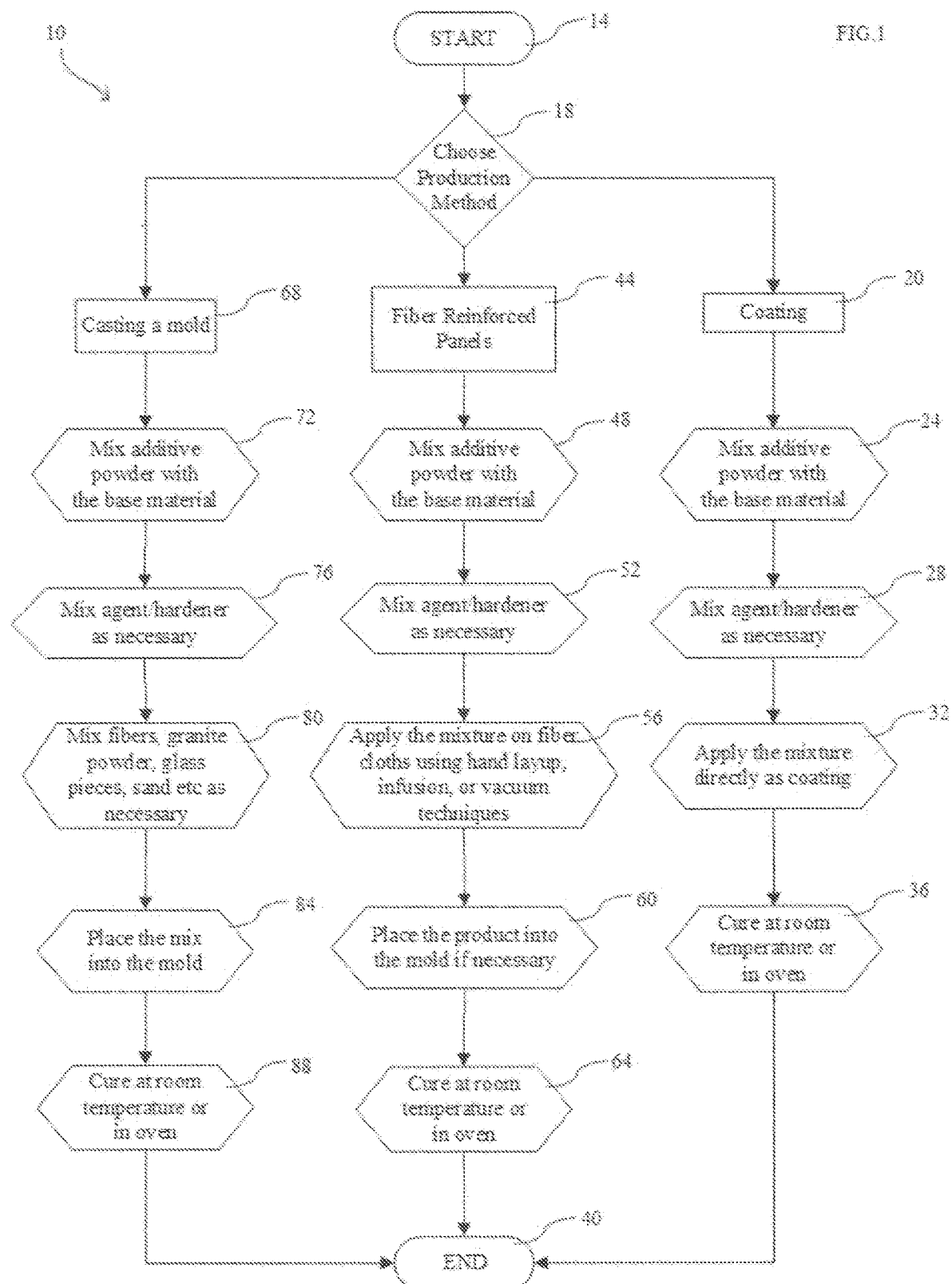
FIG. 1 is a flowchart of steps in a method of production of each of three different types of products using the additive material of exemplary embodiments of the present invention.

According to exemplary embodiments of the present invention which are described and illustrated herein, a composition of an additive material includes a base material and a curing agent that may be necessary to cure the base material, together with various materials in dry (e.g., powder) or liquid form, such as boric acid, sodium bicarbonate and (optionally) magnesium oxide in various concentrations. These concentrations are expressed herein throughout as corresponding weight percentages ("wt %") of the overall composition of the additive material, with this overall composition being understood to be 100 weight percent ("100 wt %"). Once a mixture of the additive material is prepared as described and illustrated herein, the mixture may be utilized by itself in applications such as in powder form as a fire extinguisher. In the alternative, the mixture of the additive material may then be further prepared together with other materials, for example, a fabric such as fiberglass or a filler material such as sand, glass or metal, to form an overall additive material product (e.g., panels) which can then be incorporated into larger and final products (e.g., housing structures, race cars, boats).

In addition, it should be understood that throughout this patent application and specifically in the written description and claims that follow, the terms "about" or "approximately" as used in conjunction with a stated numerical value should be taken to mean that the range of a stated numerical value is extended by a percentage value of a minimum of 0.5% on each side of the stated numerical value and a maximum of 5.0% on each side of the stated numerical value, as those ranges would be understood by one of ordinary skill in the relevant art to which embodiments of the present invention pertain.

In a first exemplary embodiment, a composition of the additive material may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 75 wt % to about 90 wt % of boric acid (e.g., $H_3BO_3$, Ph grade, orthoboric acid); and (2) from about 10 wt % to about 25 wt % of sodium bicarbonate. The boric acid and the sodium bicarbonate can be in dry (e.g., powder) or liquid form. If the curing agent is used, then during the curing process the curing agent changes from about 15 wt % to about 50 wt % of the total base material and curing agent mixture.

The weight percentages given above in this first exemplary embodiment are based on the total weight of the additive material mixture; that is, of the base material, curing agent if used, and the boric acid and sodium bicarbonate ingredients. In general, in this first embodiment the weight percentage of boric acid in the composition may be greater than the weight percentage of sodium bicarbonate.

The base material may comprise, for example and without limitation, an acrylic resin, a rosin, a plastic, a paint, or a construction material such as, for example and without limitation, concrete, a cement (e.g., Portland cement), a mortar, a plaster, or some combination thereof since these terms are often used interchangeably to describe these construction materials. Any of these base materials may be used alone or in combination with one another. The acrylic resin may comprise, for example, thermoplastic or thermosetting organic or inorganic epoxy resin, polyester resin, polyurethane resin, vinyl resins such as vinyl ester resin, and rosins.

The curing agent is needed when the base material cannot cure or harden by itself. Thus, for a resin and particularly an acrylic resin, the curing agent is needed and may comprise a hardener. This is also the case for a rosin. Concrete, a cement, a mortar, or a plaster may require a water-based curing agent or a solvent-based curing agent. A plastic may require a curing agent typically in the form of a cross-linker by itself or in addition to an alternative type of curing agent. As used herein, the term "plastic" should be considered to include all forms of plastics, including, for example and without limitation, sheets, granules, and pellets.

In a second exemplary embodiment, a composition of the additive material may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 50 wt % to about 70 wt % of boric acid (e.g., $H_3BO_3$, Ph grade, orthoboric acid); (2) from about 20 wt % to about 45 wt % of magnesium oxide; and (3) from about 5 wt % to about 15 wt % of sodium bicarbonate. The boric acid, magnesium oxide, and sodium bicarbonate can be in dry (e.g., powder) or liquid form. If the curing agent is used, then during the curing process the curing agent changes from about 15 wt % to about 50 wt % of the total base material and curing agent mixture.

Similar to the first exemplary embodiment, the weight percentages given above in this second exemplary embodiment are based on the total weight of the additive material mixture; that is, of the base material, curing agent if used, and the boric acid, magnesium oxide, and sodium bicarbonate ingredients. In general, in this second embodiment the weight percentage of boric acid in the composition may be greater than the weight percentage of sodium bicarbonate.

The base material may comprise, for example and without limitation, an acrylic resin, a rosin, a plastic, a paint, or a construction material such as, for example and without limitation, concrete, a cement (e.g., Portland cement), a mortar, a plaster, or some combination thereof since these terms are often used interchangeably to describe these construction materials. Any of these base materials may be used alone or in combination with one another. The acrylic resin may comprise, for example, thermoplastic or thermosetting organic or inorganic epoxy resin, polyester resin, polyurethane resin, vinyl resins such as vinyl ester resin, and rosins.

The curing agent is needed when the base material cannot cure or harden by itself. Thus, for a resin and particularly an acrylic resin, the curing agent is needed and may comprise a hardener. This is also the case for a rosin. Concrete, a cement, a mortar, or a plaster may require a water-based curing agent or a solvent-based curing agent. A plastic may require a curing agent typically in the form of a cross-linker by itself or in addition to an alternative type of curing agent. As used herein, the term "plastic" should be considered to include all forms of plastics, including, for example and without limitation, sheets, granules, and pellets.

In the above described first and second exemplary additive material embodiments, the compositions of the additive material of the present invention may further comprise up to approximately 40 wt % of an additional filler material, to thereby form additional exemplary embodiments of the composition of the additive material. The filler material may comprise, for example and without limitation, paint, sand, natural materials, stones, minerals, glass and glass pieces, fiber and fiber pieces, powdered coal, granite powder, crystals, powdered ceramics, metals and metal pieces, clay, concrete, cement, mortar, plaster, plastics, and other similar suitable materials, wherein these filler materials and other suitable filler materials may take various forms, including solids, liquids, powders, etc. These filler materials may be mixed with the first and second exemplary embodiment additive material compositions using suitable mixing procedures which depend in large part on the type and form of the filler material (e.g., solid, liquid).

Methods of Production.

It should be understood that many different manufacturing or production methods, processes, or procedures may be utilized to produce or manufacture various products which comprise or include the additive material of the different exemplary embodiments of the present invention specifically disclosed herein and other related yet non-disclosed embodiments of the additive material. For example, methods, processes, or procedures in the nature of molding, infusion, hand layup, vacuum, blow injection, or any other suitable construction, production, or manufacturing methods can be used to give a desired form or shape to the additive material and the material or products that additive material is utilized with or incorporated into. The particular method chosen may depend in part on the particular usage of the additive material and the type of any filler material which is used together with the additive material.

Referring to FIG. 1, there illustrated is a flowchart of steps in an exemplary embodiment of a method 10 of production or manufacturing of three different types of products that each utilize or incorporate the additive material of exemplary embodiments of the present invention described hereinabove. After a start step 14, a choice is made in a step 18 as to which one of three different types of exemplary products in general will be manufactured or produced using the additive material of the exemplary embodiments described herein.

A first set 20 of method steps involves the steps of coating of a product. This set 20 of steps includes a step 24 in which an additive material mixture is made or produced using a base material and adding boric acid and sodium bicarbonate (and magnesium oxide in certain embodiments) to form a mixture. These materials may be in liquid or powder form or a combination thereof.

As described in detail hereinabove, a first exemplary embodiment of the composition of this additive material mixture may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 75 wt % to about 90 wt % of boric acid (e.g., $H_3BO_3$, Ph grade, orthoboric acid); and (2) from about 10 wt % to about 25 wt % of sodium bicarbonate. If a curing agent is used, it may be added at this time or added later in the step 28 as described in detail hereinafter. This is because the curing agent typically starts the chemical process of curing the base material mixed with the added ingredients. As such, it may be beneficial to first mix the base material with the added ingredients with enough time to then mix these materials together before the curing process starts.

Also as described in detail hereinabove, a second exemplary embodiment of the composition of this additive material mixture may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 50 wt % to about 70 wt % of boric acid (e.g., $H_3BO_3$, Ph grade, orthoboric acid); (2) from about 20 wt % to about 45 wt % of magnesium oxide; and (3) from about 5 wt % to about 15 wt % of sodium bicarbonate. If a curing agent is used, it may be added at this time or added later in the step 28, as described hereinabove with respect to the first exemplary embodiment.

The boric acid, magnesium oxide (when included), and sodium bicarbonate may each be added directly to the base material. This allows for all of the materials to be mixed homogeneously with the base material Next, in a step 28, the curing agent is mixed as necessary with the other ingredients to create a homogeneous mixture of the additive material. A step 32 follows which may be to directly coat the second mixture onto an article such as a panel of, e.g., insulating material, to produce an insulator panel, or other types of panels or structures. The additive material mixture may be in the form of a liquid paint which may be painted directly onto one or more surfaces of the article.

A step 36 is then performed in which a desired form or shape is given to the coated article, for example, by: (1) blowing air at a temperature of approximately 22-60° C. onto the coated article to dry the coated article until it hardens; and (2) leaving the coated article to rest for about 8-24 hours in a temperature of approximately 22-60° C. to obtain an overall or final additive material product. These steps can be performed using an oven. The drying time in step 36 varies primarily based on the desired thickness of the overall or final additive material product. The method then ends in a step 40.

Still referring to FIG. 1, a second set 44 of method steps may be followed when it is desired to treat a fabric such as fiberglass cloth or other type of fiber cloth or material (e.g., carbon fiber, Kevlar, canvas fabric) with the additive material mixture to thereby reinforce the fabric. This set 44 of steps includes a step 48, in which an additive material mixture is made or produced using a base material and adding boric acid and sodium bicarbonate (and magnesium oxide in certain embodiments) to from a mixture. These materials may be in liquid or powder form or a combination thereof.

As described in detail hereinabove, a first exemplary embodiment of the composition of this additive material mixture may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 75 wt % to about 90 wt % of boric acid (e.g., $H_3BO_3$, Ph grade, orthoboric acid); and (2) from about 10 wt % to about 25 wt % of sodium bicarbonate. If a curing agent is used, it may be added at this time or added later in the step 52 as described in detail hereinafter. This is because the curing agent typically starts the chemical process of curing the base material mixed with the added ingredients. As such, it may be beneficial to first mix the base material with the added ingredients with enough time to then mix these materials together before the curing process starts.

Also as described in detail hereinabove, a second exemplary embodiment of the composition of this additive material mixture may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 50 wt % to about 70 wt % of boric acid (e.g., $H_3BO_3$, Ph grade, orthoboric acid); (2) from about 20 wt % to about 45 wt % of magnesium oxide; and (3) from about 5 wt % to about 15 wt % of sodium bicarbonate. If a curing agent is used, it may be added at this time or added later in the step 52, as described hereinabove with respect to the first exemplary embodiment.

The boric acid, magnesium oxide (when included), and sodium bicarbonate may each be added directly to the base material. This allows for all of the materials to be mixed homogeneously with the base material Next, in a step 52, the curing agent is mixed as necessary with the other ingredients to create a homogeneous mixture of the additive material. A step 56 follows which may be to apply the additive material mixture onto each of one or more layers of fiberglass cloth. The additive material mixture may be applied using various techniques, including hand layup, infusion, injection, vacuum techniques, or other suitable techniques.

The next step 60 is optional and may be to place the fiberglass cloth treated with the additive material mixture into a mold to give the treated fiberglass cloth a desired shape of the final product. A step 64 is then performed in which the additive material mixture as applied to the fiberglass cloth is cured, for example, by: (1) blowing air at a temperature of approximately 22-60° C. onto the fiberglass cloth to dry the fiberglass cloth until it hardens; and (2) leaving the fiberglass cloth to rest for about 8-24 hours in a temperature of approximately 22-60° C. to obtain an overall or final additive material product. These steps can be performed using an oven. The drying time in step 64 varies primarily based on the desired thickness of the overall or final additive material product. The method then ends in the step 40.

Still referring to FIG. 1, a third set 68 of method steps may be followed when it is desired to create a product by placing an amount of the additive material mixture directly into a mold. This method may be referred to as a "casting" method. This set 68 of steps includes a step 72, in which an additive material mixture is made or produced using a base material and adding boric acid and sodium bicarbonate (and magnesium oxide in certain embodiments) to form a mixture. These materials may be in liquid or powder form or a combination thereof.

As described in detail hereinabove, a first exemplary embodiment of the composition of this additive material mixture may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 75 wt % to about 90 wt % of boric acid (e.g., $H_3BO_3$, Ph grade, orthoboric acid); and (2) from about 10 wt % to about 25 wt % of sodium bicarbonate. If a curing agent is used, it may be added at this time or added later in the step 76 as described in detail hereinafter. This is because the curing agent typically starts the chemical process of curing the base material mixed with the added ingredients. As such, it may be beneficial to first mix the base material with the added ingredients with enough time to then mix these materials together before the curing process starts.

Also as described in detail hereinabove, a second exemplary embodiment of the composition of this additive material mixture may comprise: (a) from about 50 wt % to about 95 wt % of a mixture of a base material and a curing agent that may be necessary to cure the base material; and (b) from about 5 wt % to about 50 wt % of a mixture of ingredients comprising: (1) from about 50 wt % to about 70 wt % of boric acid (e.g., $H_3BO_3$, Ph grade, orthoboric acid); (2) from about 20 wt % to about 45 wt % of magnesium oxide; and (3) from about 5 wt % to about 15 wt % of sodium bicarbonate. If a curing agent is used, it may be added at this time or added later in the step 76, as described hereinabove with respect to the first exemplary embodiment.

The boric acid, magnesium oxide (when included), and sodium bicarbonate may each be added directly to the base material. This allows for all of the materials to be mixed homogeneously with the base material Next, in a step 76, the hardener or curing agent is mixed as necessary with the other ingredients to create a homogeneous mixture of the additive material. A step 80 follows in which additional filler materials (e.g., fibers, granite powder, glass pieces, sand, etc.) as described hereinabove may be added to the additive material mixture.

Next, a step 84 involves placing the additive material mixture into a mold. This is done to give the final product made from the additive material mixture a desired shape. A step 88 is then performed in which the additive material mixture within the mold is cured, for example, by: (1) blowing air at a temperature of approximately 22-60° C. onto the mold to hardens the additive material mixture; and (2) leaving the molded product to rest for about 8-24 hours in a temperature of approximately 22-60° C. to obtain an overall or final additive material product. These steps can be performed using an oven. The drying time in step 88 varies primarily based on the desired thickness of the overall or final additive material product. The method then ends in the step 40. In the case where plastic pellets/granules comprise the base material, the curing temperature is the regular curing temperature of the plastic, which is up to 250° C.

In an alternative exemplary embodiment not shown in FIG. 1 yet similar to the above described exemplary embodiments, the composition of the additive material mixture may comprise: (a) from about 50 wt % to about 70 wt % of boric acid (e.g., $H_3BO_3$, Ph grade, orthoboric acid); (b) from about 20 wt % to about 45 wt % of magnesium oxide; and (c) from about 5 wt % to about 15 wt % of sodium bicarbonate. The additive material mixture may be in powder form. As such, this embodiment of the additive material mixture can be used directly to extinguish fires by spreading the mixture on the fire itself, or by including the mixture in a fire extinguisher or other container and spraying the mixture onto the fire.

Figure 2:
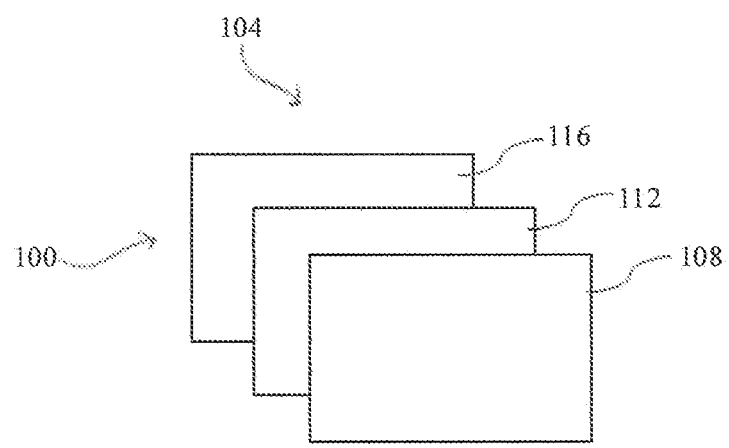
FIG. 2 is a perspective and exploded view of a three-layer section of a portion of a boat using the additive material of exemplary embodiments of the present invention.

FIG. 2 is a perspective and exploded view of a multi-layered section 100 of a boat 104 (e.g., a portion of the hull of the boat 104). In an exemplary embodiment of the present invention, the section 100 may comprise three layers 108, 112, 116. Each layer 108, 112, 116 comprises fiberglass cloth of suitable weight which incorporates the additive material of exemplary embodiments of the present invention applied to or mixed with the fiberglass cloth. The first layer 108 may comprise fiberglass cloth at a weight of 350 grams per square foot. The second layer 112 may comprise fiberglass cloth at a weight of 450 grams per square foot. The third layer 116 may comprise fiberglass cloth at a weight of 350 grams per square foot. It should be understood that these weights for the fiberglass cloth layers 108, 112, 116 are purely exemplary. Any suitable weights for the fiberglass cloth layers 108, 112, 116 may be utilized in light of the teachings herein.

Each fiberglass cloth layer 108, 112, 116 of the exemplary embodiment of FIG. 2 of the section 100 of the boat 104 may utilize a polyester resin (e.g., C92) that is mixed with the ingredients of the additive mixture of the embodiments of the present invention described hereinabove; that is, mixed with the boric acid, the sodium bicarbonate, and optionally the magnesium oxide. Other resins besides a polyester resin may be utilized. The mixture of the polyester resin and the additive material may then be applied to the fiberglass cloth to form each layer 108, 112, 116, which are then pressed together to form the section 100.

Upon testing of the section 100, it was discovered that the three layers 108, 112, 116 together were stronger than a four-layer section made using the same fiberglass cloth and polyester resin, but without the additive material being added to the resin. Specifically, an external force applied by a hammer to the section 100 exhibited no signs of damage. In contrast, the four-layer section without the additive material exhibited chips and cracks upon application of the hammer force.

It should be understood by one of ordinary skill in the art that the section 100 of the boat 104 described hereinabove and illustrated in FIG. 2 is exemplary of the type of construction and/or product structural applications of the additive material of embodiments of the present invention. Other structural applications of the additive material should be apparent to one of ordinary skill in the art in light of the teachings herein.

Uses.

The additive material of exemplary embodiments of the present invention has many uses as integral parts of various products that are utilized in different industries. These uses include, for example and without limitation, as part of original products (e.g., panels or surfaces in structures such as homes or commercial buildings) or for repair of existing products (e.g., fiberglass repair of boats).

The significantly increased strength properties of the additive material of embodiments of the present invention allow for its usage in applications such as bullet-proof vests, as the bodies of race cars, and as the hulls or other structural portions of boats. These and other properties of the additive material such as its heat and fire resistance and flame retardance allow it to be used in various other applications including as a coating for material such as foam. As such, the additive material coating adheres to the foam without altering the composition of the foam.

Also, the additive material may be mixed with various types of base materials such as acrylic resins which allow the additive material to contain anti-bacterial properties. This allows for the additive material to be utilized in applications when cleanliness is of high importance, such as, for example and without limitation, in the home in the form of interior wall and ceiling panels, kitchen and bath countertops, cutting boards, and other similar surfaces; and in sterile settings such as in hospitals, doctor's offices, nursing homes, assisted living facilities, etc. As a specific example, the additive material can be added to paint (e.g., up to 25 wt % of the overall additive material product) to provide the paint with anti-bacterial properties and flame retardance. The paint may be used to paint the walls, ceilings, and other surfaces within these sterile facilities.

When used as part of an insulator product, the additive material of exemplary embodiments of the present invention may be completely solid and flat and does not contain any air between the layers of the overall insulator product (i.e., is airtight). Also, typically the insulator product does not provide for acoustic insulation.

In a similar manner, certain base materials such as acrylic resins may be used that allow the additive material to be used in conjunction with food products, such as for example and without limitation, wrappers for sandwiches, packaging for various other food products, etc.

Further, the additive material can be used in the agricultural environment—for example, as equipment in insulation rooms/warehouses, product transport containers and agricultural machinery. It may also be used in apparel as an accessory to fabric (and not directly within the fabric) that is part of various items of clothing.

In addition, since the additive material of exemplary embodiments of the present invention has high viscosity, it can also be used for adhesive bonding and for fusion purposes. More specifically, the additive material can be used as an adhesive and or a protective coating when applied to surfaces immediately or soon after the additive material mixture has been prepared and then leaving the bonded or protected product to dry in a non-humid location at a temperature of, e.g., 22 to 60 degrees Celsius.

Moreover, it has been observed that when the additive material of exemplary embodiments is used together with various composite materials, the time required to cure the composites may decrease up to 30% depending on the base material used. Also, it has been observed that use of the additive material of exemplary embodiments decreases the amount of hardener needed to cure the base material.

The following technical advantages may be achieved with the exemplary embodiments of the additive material of the present invention: (1) high strength; (2) high elasticity; (3) lightweight; (4) high heat and flame resistance; (5) flame retardant; (6) anti-bacterial; (7) liquid-proof; (8) high corrosion resistance; (8) over 95% recyclable—therefore, relatively more environmentally friendly than other known, prior art additive materials; and (9) may be produced as an electrical conductor or as insulator.

Testing.

The additive material of the exemplary embodiments of the present invention described and illustrated herein has undergone various testing procedures. Specifically, ASTM D3039 testing (i.e., Standard Test Method for Tensile Properties for Polymer Matrix Composite Materials) was performed on five samples of the additive material having the three ingredients of the second exemplary embodiment as described hereinabove—i.e., boric acid, magnesium oxide, and sodium bicarbonate. The test samples were prepared with furniture/floor grade clear 100% solid epoxy (e.g., F102A1NL) and biaxial fiberglass cloth. Each test sample had an average width or thickness of 3.3 mm (0.13 inch) and were produced using a hand layup method. Further, the test samples were not vacuum bagged.

This testing demonstrated that the additive material of these embodiments was approximately 10% to 20% stronger than similar known composite materials and had an approximate 20% to 30% increase in its modulus of elasticity. These results are as compared to known prior art composites in the nature of glass-fiber reinforced plastics. Also, these relatively significant increases in strength and elasticity of the additive material means that the resulting additive material product has high stiffness and that deformation of the product is unlikely. This allows for use of these additive material products in industries that require products to withstand relative high amounts of external forces.

In addition, ASTM D6641 testing (i.e., Standard Test Method for Compressive Properties of Polymer Matrix Composite Materials Using a Combined Loading Compression (CLC) Test Fixture) was performed on five samples of the additive material having the three ingredients of the second exemplary embodiment as described hereinabove—i.e., boric acid, magnesium oxide, and sodium bicarbonate. The samples were prepared with furniture/floor grade clear 100% solid epoxy (F102A1NL) and five layers of biaxial fiberglass cloth. Each test sample had an average width or thickness of 7.0 mm (0.27 inch) and were produced using a hand layup method. Further, the test samples were not vacuum bagged.

This testing demonstrated that the test samples performed at least as good and sometimes better with use of fiberglass as opposed to carbon fiber, and with a smaller number of layers, and without vacuum bagging or using infusion methods. This is as compared to known, prior art carbon fiber reinforced panels having, e.g., eight layers of cloth.

Other test procedures performed on exemplary embodiments of the additive material of the present invention demonstrated that the additive material of the exemplary embodiments was relatively more flame retardant than a sample comprising resin and borax—which is a salt of boric acid. The additive material of the exemplary embodiments does not include borax. Instead, the boric acid is added directly to the resin with the other ingredients (magnesium oxide, sodium bicarbonate), which allows the end product to be more flame retardant.

The terminology used herein is for the purpose of describing particular embodiments of the invention only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention is provided in detail in connection with only a limited number of embodiments, it should be readily understood that the invention is not limited to only such disclosed embodiments. Rather, the invention can be modified to incorporate any number of variations, alterations, substitutions, or equivalent arrangements or embodiments not heretofore described, but which are commensurate with the spirit and scope of the invention. Additionally, while various embodiments of the invention have been described, it is to be understood that the exemplary embodiments may include only some of the described exemplary aspects. Accordingly, the invention is not to be seen as limited by the foregoing description but is only limited by the scope of the appended claims.

The invention claimed is:

1. An additive material, comprising a composition of:
   (a) from about 50 wt % to about 95 wt % of a base material selected from the group consisting of thermosetting resins, rosins, paints, concretes, cements, mortars, and plasters, and a curing agent when required to cure the base material; and
   (b) from about 5 wt % to about 50 wt % of a weight percentage of boric acid, a weight percentage of magnesium oxide, and a weight percentage of sodium bicarbonate, wherein the weight percentage of boric acid is greater than the weight percentage of sodium bicarbonate,
   wherein the weight percentage of boric acid is from about 50 wt % to about 75 wt %, based on the total weight of boric acid, sodium bicarbonate, and magnesium oxide, the weight percentage of magnesium oxide is from about 20 wt % to about 45 wt %, based on the total weight of boric acid, sodium bicarbonate, and magnesium oxide, and the weight percentage of sodium bicarbonate is from about 5 wt % to about 15 wt %, based on the total weight of boric acid, sodium bicarbonate, and magnesium oxide.

2. The additive material of claim 1, wherein the composition further comprises an amount of a filler material in a weight percentage of the composition ranging from greater than 0 wt % to approximately 40 wt %, based on the total weight of the composition.

3. The additive material of claim 2, wherein the filler material is selected from the group consisting of paint, sand, natural materials, stones, minerals, glass and glass pieces, fiber and fiber pieces, powdered coal, granite powder, crystals, powdered ceramics, metals and metal pieces, clay, concrete, cement, mortar, plaster, and plastics.

4. The additive material of claim 1, wherein the curing agent is one of a hardener, water, a cross-linker, a bonding agent, a water-based curing agent, a solvent-based curing agent.

5. The additive material of claim 1, wherein during a curing process within the composition the curing agent changes from about 15 wt % to about 50 wt % of a mixture of the base material and the curing agent within the composition.

6. The additive material of claim 1, wherein the boric acid is in one of a liquid form or a powder form, the magnesium oxide is in one of a liquid form or a powder form, and the sodium bicarbonate is in one of a liquid form or a powder form.

7. The additive material of claim 1, wherein the composition is configured to contain anti-bacterial properties and flame-retardant properties.

8. The additive material of claim 1, wherein the composition is configured to contain anti-bacterial properties and flame-retardant properties.

9. A method for producing an additive material product from the additive material od claim 1, comprising the steps of:
   making an amount of the additive material, comprising the steps of:
      mixing together the base material, the boric acid, the sodium bicarbonate, and the magnesium oxide to form a first mixture; and
      mixing an amount of the curing agent if necessary to cure the base material to form the amount of the additive material; and
   applying the additive material to an intermediate product to produce the additive material product.

10. The method of claim 9, wherein the step of applying the additive material to an intermediate product to produce the additive material product further comprises the steps of:
   applying the additive material as a coating onto a surface of the intermediate product; and
   curing the additive material to produce the additive material product.

11. The method of claim 9, wherein the step of applying the additive material to an intermediate product to produce the additive material product further comprises the steps of:
   applying the additive material into the intermediate product; and
   curing the additive material to produce the additive material product.

12. The method of claim 11, wherein the intermediate product comprises a fabric, and wherein the step of applying the additive material to the intermediate product further comprises one of the steps of: (1) hand layup of the additive material into the fabric and optionally using a vacuum technique; and (2) infusing the additive material into the fabric.

13. The method of claim 9, wherein the step of applying the additive material to an intermediate product to produce the additive material product further comprises the steps of:
   applying an amount of the additive material within a mold; and
   curing the additive material within the mold to produce the additive material product.

14. The method of claim 9, further comprising the step of adding an amount of a filler material to the additive material.

* * * * *

UNITED STATES PATENT AND TRADEMARK OFFICE
CERTIFICATE OF CORRECTION

PATENT NO. : 12,305,067 B2
APPLICATION NO. : 17/567139
DATED : May 20, 2025
INVENTOR(S) : Mustafa Tansel Tekin Page 1 of 1

It is certified that error appears in the above-identified patent and that said Letters Patent is hereby corrected as shown below:

On the Title Page

Insert:
-- (30) Foreign Application Priority Data
Jun. 15, 2020    (TR) .... 2020/09188 --.

Signed and Sealed this
Twenty-fourth Day of June, 2025

Coke Morgan Stewart
*Acting Director of the United States Patent and Trademark Office*